United States Patent
Kurosawa et al.

(10) Patent No.: US 6,240,155 B1
(45) Date of Patent: *May 29, 2001

(54) PREVENTIVE MAINTENANCE APPARATUS FOR STRUCTURAL MEMBERS IN A NUCLEAR PRESSURE VESSEL

(75) Inventors: Koichi Kurosawa; Eisaku Hayashi, both of Hitachi; Sadato Shimizu, Hitachinaka; Minoru Ootaka, Takahagi; Fujio Yoshikubo, Mito; Ren Morinaka, Hitachi; Masayuki Nishino, Hitachinaka; Noboru Chiba; Kunio Enomoto, both of Tokai-mura; Kazunori Sato, Kure, all of (JP)

(73) Assignees: Hitachi, Ltd.; Babcock-Hitachi Kabushiki Kaisha, both of Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/366,720

(22) Filed: Aug. 4, 1999

Related U.S. Application Data

(62) Division of application No. 09/026,726, filed on Feb. 20, 1998, now Pat. No. 6,058,153.

(30) Foreign Application Priority Data

Feb. 24, 1997 (JP) ........................................................ 9-38935

(51) Int. Cl.$^7$ .................................................... G21C 17/00

(52) U.S. Cl. .......................... 376/305; 376/249; 376/260; 376/261; 376/262; 376/263; 376/310; 376/316

(58) Field of Search ................................... 376/260–263, 376/305, 310, 316, 249

(56) References Cited

U.S. PATENT DOCUMENTS

| | | | |
|---|---|---|---|
| 4,496,519 | * 1/1985 | McGuire | 376/316 |
| 4,691,723 | 9/1987 | Mierswa et al. | 134/167 C |
| 5,305,361 | * 4/1994 | Enomoto et al. | 376/316 |
| 5,369,676 | * 11/1994 | Ortega et al. | 376/271 |
| 5,418,824 | 5/1995 | Monserud et al. | 376/316 |
| 5,465,278 | 11/1995 | Cowan, II et al. | 376/245 |
| 5,553,106 | * 9/1996 | Enomoto et al. | 376/305 |
| 5,586,155 | * 12/1996 | Erbes et al. | 376/249 |
| 5,734,690 | * 3/1998 | Sakamki | 376/260 |
| 5,778,713 | * 7/1998 | Butler et al. | 72/53 |

FOREIGN PATENT DOCUMENTS

| | | |
|---|---|---|
| 61-296293 | * 12/1986 | (JP) . |
| 62-63614 | 3/1987 | (JP) . |
| 62-116292 | * 4/1987 | (JP) . |
| 5-78738 | 3/1993 | (JP) . |
| 7-270591 | 10/1995 | (JP) . |
| 8-132307 | * 5/1996 | (JP) . |
| 10-268080 | * 10/1998 | (JP) . |

\* cited by examiner

Primary Examiner—Michael J. Carone
Assistant Examiner—Jack Keith
(74) Attorney, Agent, or Firm—Mattingly, Stanger & Malur

(57) ABSTRACT

A method of performing maintenance on a structural member inside a reactor pressure vessel includes lowering an annular guide rail having a second lug until the guide rail rests on an upper flange of a core shroud provided inside the reactor pressure vessel, detachably mounting the second lug of the guide rail to a first lug mounted on the core shroud, positioning a discharging nozzle at a position at which compressive remaining stress is added to a surface of the core shroud by moving the discharging nozzle in a radial direction and an axial direction of the core shroud by a discharging nozzle moving apparatus mounted on a turnable revolving on the guide rail and discharging water to add compressive remaining stress to a surface of the core shroud from the discharging nozzle.

11 Claims, 12 Drawing Sheets

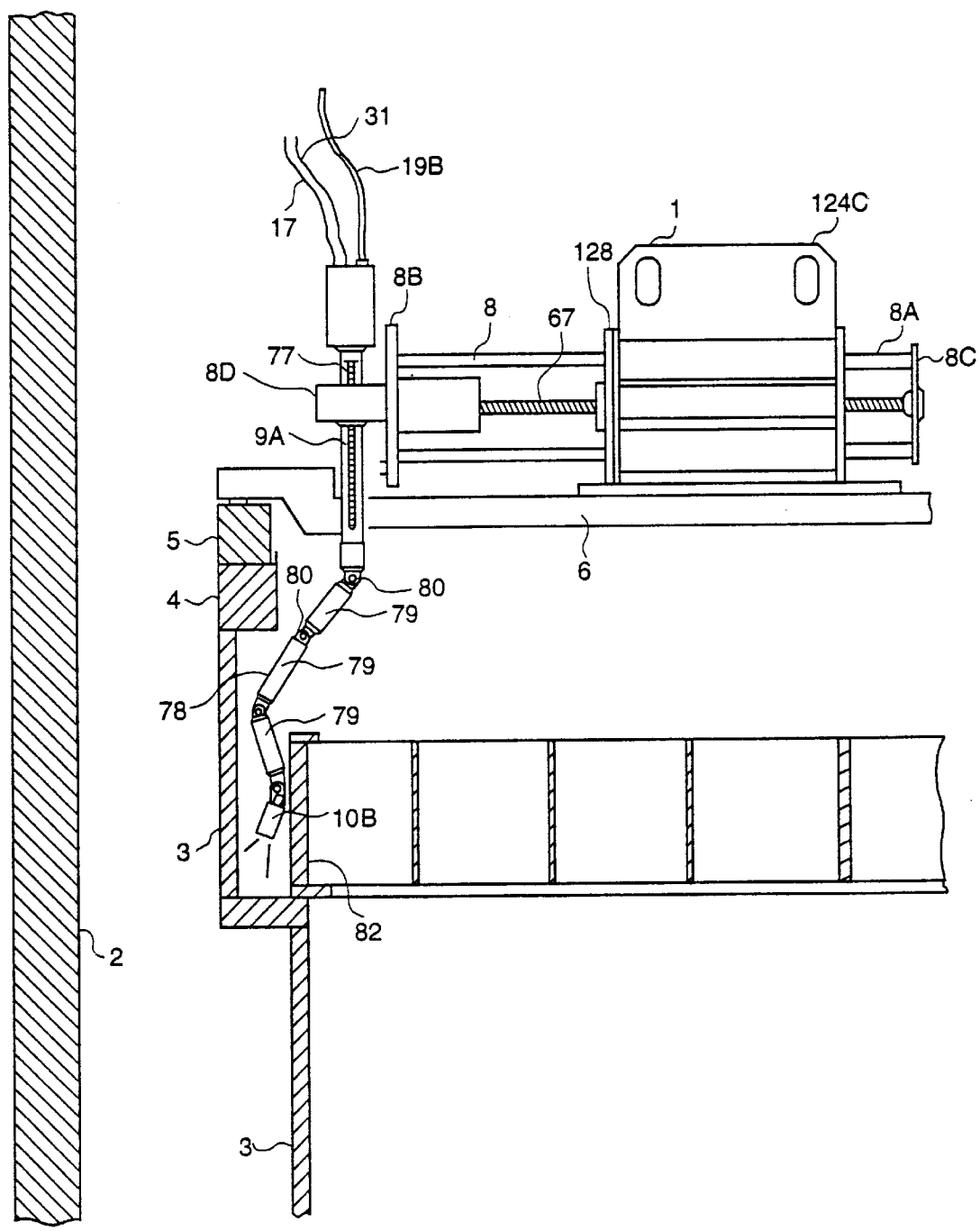

PREVENTIVE MAINTENANCE APPARATUS FOR STRUCTURAL MEMBERS IN A NUCLEAR PRESSURE VESSEL

This is a divisional application of U.S. Ser. No. 09/026,726, filed Feb. 20, 1998, now U.S. Pat. No. 6,058,153.

BACKGROUND OF THE INVENTION

The present invention relates to a preventive maintenance apparatus for structural members in a nuclear pressure vessel and, more particularly, to a preventive maintenance apparatus for structural members in a nuclear pressure vessel capable of preventing occurrence of stress corrosion cracks of structural members by adding compressive remaining stress to surfaces of the structural members. The present invention relates to a preventive maintenance apparatus for structural members in a nuclear pressure vessel suitable for adding compressive residual stress to a surface of a welded portion and a heat affected zone in each of core internals of, preferably, a boiling water reactor (BWR) such as a core shroud, a shroud support cylinder, a shroud support leg, a shroud support plate and a jet pump diffuser.

Japanese Patent Application Laid-Open No.62-63614 discloses a method of releasing tensile remaining stress in a welded portion which may become a cause of occurrence of stress corrosion cracks. In the method, a high pressure water shot peening apparatus is inserted inside of a heat transfer tube of a heat exchanger to peen an inner surface of the heat transfer tube by axial kinetic pressure energy of a high pressure water jet (kinetic pressure energy of a confined water jet in the axial direction). Tensile remaining stress having existed near the inner surface of the heat transfer tube is converted into compressive remaining stress by the peening. The high pressure water shot peening apparatus comprises a rotating nozzle portion for discharging a high pressure liquid jet.

Further, Japanese Patent Application Laid-Open No.5-78738 discloses an improving method of converting tensile remaining stress on a surface of a core shroud in a reactor pressure vessel into compressive remaining stress by water jet peening. The water jet peening is performed by arranging a traveling cart mounting a vertical driving apparatus on a flange in a top end portion of the reactor pressure vessel. An upper mast and a lower mast having a water jet discharging head in the top end are mounted onto the vertical driving apparatus. A high pressure water jet is discharged from a water jet discharging nozzle of the water jet discharging head to generate cavitation. Air bubbles generated by the cavitation are hit on a surface of the shroud.

Furthermore, Japanese Patent Application Laid-Open No.7-270591 discloses a method in which preventive maintenance apparatuses comprising a nozzle unit having an upper attachment, a lower attachment and a drive mechanism for a discharging nozzle and a main apparatus body are arranged in a top end portion of a CRD housing and a lower core support plate inside a reactor pressure vessel to generate cavitation bubbles by discharging a high pressure jet from the discharging nozzle. The method also discloses a method of improving remaining stress by water jet peening. The cavitation bubbles are hit onto the surfaces of a lower barrel of the core shroud, a core shroud support cylinder and so on. Tensile remaining stress in the surfaces of the lower barrel of the core shroud, the core shroud support cylinder and so on is converted to compressive remaining stress.

The method of the prior art disclosed in Japanese Patent Application Laid-Open No.62-63614 is effective as a method of releasing the remaining stress in a heat exchanger and the like. The axial kinetic pressure of the water jet in this method can be effectively used in the work under atmospheric pressure. However, when the high pressure shot peening apparatus of the prior art is used under water, an effective peening effect cannot be obtained because the axial kinetic pressure of the water jet is substantially decayed under water. In order to obtain an axial kinetic pressure equivalent to that under a condition of air atmosphere under a condition of water using the high pressure shot peening apparatus, a water jet of ultra high pressure discharge is necessary. Accordingly, the pump and the related components used need to have structures capable of withstanding the ultra high pressure. In order to avoid such structures, it is required to discharge the high pressure liquid jet under air atmosphere by lowering a core water level inside the reactor pressure vessel. Since lowering of the core water level causes an increase in the environmental radiation dose, radiation exposure to workers may be increased.

On the other hand, the method of improving remaining stress by the water jet peening disclosed in Japanese Patent Application Laid-Open No.5-78738 is effective as a method of improving remaining stress in core internals such as a core shroud. However, since the traveling cart having the mast is placed on the top end portion of the reactor pressure vessel, the mast becomes long in order to apply the method of improving remaining stress by water jet peening to the lower barrel of the core shroud, the core shroud support cylinder and so on. In addition to this, the apparatus is difficult to be handled. It cannot be said that this is preferable from the viewpoint of workability.

The method of improving remaining stress by the water jet peening disclosed in Japanese Patent Application Laid-Open No.7-270591 is an effective technology aiming to improve the workability which is the problem in the method of improving remaining stress described in Japanese Patent Application Laid-Open No.5-78738 since the apparatus does not have any long mast. However, application of the method in Japanese Patent Application Laid-Open No.7-270591 is limited within a small field of preventive maintenance work since the preventive maintenance apparatus is attached to the top end portion of the CRD housing and the lower core support plate inside the reactor pressure vessel. Therefore, it is necessary that the preventive maintenance apparatus is detached and moved from one CRD housing after completion of the preventive maintenance work to a portion existing in the inner surface of the core shroud to be set to another CRD housing.

SUMMARY OF THE INVENTION

An object of the present invention is to provide a preventive maintenance apparatus for structural members in a reactor pressure vessel which is capable of being easily arranged on a core shroud and easily moving a discharging nozzle to a portion to perform preventive maintenance.

A first invention to attain the above-mentioned object is characterized by a preventive maintenance apparatus for structural members inside a reactor pressure vessel which comprises a ring-shaped guide rail having a plurality of lugs, the guide rail being placed on an upper flange of a core shroud provided inside a reactor pressure vessel, at least one of the plurality of lugs engaging with a plurality of guide rods provided on an inner surface of the reactor pressure vessel; a turntable rotatable on the guide rail; a discharging nozzle moving apparatus for moving a discharging nozzle in a radial direction of the core shroud and in an axial direction of the core shroud, the discharging nozzle moving apparatus being placed on the turntable; and a high pressure water supply apparatus for supplying high pressure water to the discharging nozzle.

Since the guide rail has the plurality of lugs engaging with the plurality of guide rods provided in the inner surface of the reactor pressure vessel, the guide rail can be easily moved downward up to the upper portion of the core shroud along the guide rods. Therefore, the guide rail can be easily placed on the upper flange without being interfered with main steam line plugs which are inserted into opening portions of main steam pipes. In addition to this, since the turntable can be rotated, the discharging nozzle can be easily moved to a portion to perform preventive maintenance. Since the turntable is rotated on the guide rail placed on the upper flange, the turntable does not contact the upper flange. Accordingly, the upper flange can be prevented from being damaged by the rotation of the turntable.

A second invention to attain the above-mentioned object is characterized by a preventive maintenance apparatus for structural members inside a reactor pressure vessel which comprises a first discharging nozzle moving apparatus for moving a discharging nozzle in a radial direction of the core shroud and in an axial direction of the core shroud, the discharging nozzle discharging high pressure water to add compressive remaining stress to an outer surface of the core shroud, the discharging nozzle moving apparatus being placed on the turntable; and a second discharging nozzle moving apparatus for moving a discharging nozzle in a radial direction of the core shroud and in an axial direction of the core shroud, the discharging nozzle discharging high pressure water to add compressive remaining stress to an inner surface of the core shroud, the discharging nozzle moving apparatus being placed on the turntable.

Since the first and the second discharging nozzle moving apparatuses are installed in the turntable, compressive remaining stress can be added to both of the outer surface and the inner surface of the core shroud. Therefore, it is possible to shorten the time for performing preventive maintenance to the core shroud.

A third invention to attain the above-mentioned object is characterized by a preventive maintenance apparatus for structural members inside a reactor pressure vessel in which the second discharging nozzle moving apparatus comprises an arm member movable in a horizontal direction; a pole member movable in an axial direction of the core shroud provided in the arm member; a multi-joint arm attached to the pole member; and the discharging nozzle provided in a top end portion of the multi-joint arm.

Since the multi-joint arm is provided, it is possible to insert the discharging nozzle into a narrow portion formed between the core shroud and an upper core grid plate placed on the core shroud. Therefore, compressive remaining stress can be added to the inner surface of the core shroud in the narrow portion.

A fourth invention to attain the above-mentioned object is characterized by a preventive maintenance apparatus for structural members inside a reactor pressure vessel in which the first discharging nozzle moving apparatus comprises an arm member movable in a horizontal direction; a pole member movable in an axial direction of the core shroud provided in the arm member, the pole member being inserted between the reactor pressure vessel and the core shroud; a vertically moved body attached to the pole member, the vertically moved body being movable in a vertical direction; and the discharging nozzle provided in a top end portion of the vertically moved body.

Since the vertically moved body having the discharging nozzle can be vertically moved along the pole member, it is possible to easily add compressive remaining stress to a welded portion of the core shroud and the vicinity.

A fifth invention to attain the above-mentioned object is characterized by a preventive maintenance apparatus for structural members inside a reactor pressure vessel which comprises a water supply apparatus for cleaning reactor water and supplying the water to a high pressure water supply apparatus.

Since the reactor water is cleaned to be supplied to the high pressure supply apparatus, the water discharged from the discharging nozzle becomes the reactor water again. Accordingly, an amount of the reactor water inside the reactor pressure vessel and the reactor well is never increased even when the high pressure water is discharged from the discharging nozzle during preventive maintenance work. Therefore, radioactive disposal liquid cannot be produced even when the high pressure water is discharged from the discharging nozzle.

A sixth invention to attain the above-mentioned object is characterized by a preventive maintenance apparatus for structural members inside a reactor pressure vessel which comprises a crud sucking apparatus for sucking crud suspending in reactor water.

Since it is possible to remove crud suspended in the reactor water during preventive maintenance work, visibility under the reactor water can be improved. Therefore, it is possible to clearly monitor a portion under preventive maintenance work using an image in a monitoring camera.

A seventh invention to attain the above-mentioned object is characterized by a preventive maintenance apparatus for structural members inside a reactor pressure vessel which comprises a bubble collecting apparatus for collecting bubbles reaching a water surface in a reactor well, the bubble collecting apparatus being placed near the water surface.

Since the bubble collecting apparatus is provided, it is possible to prevent radioactive materials floating up in the reactor water accompanied by the bubbles from being dispersed. Therefore, it is possible to suppress radiation exposure to workers.

An eighth invention to attain the above-mentioned object is characterized by a preventive maintenance apparatus for structural members inside a reactor pressure vessel in which the first discharging nozzle moving apparatus comprises an arm member movable in a horizontal direction; a plurality of pole members provided in the arm member, the pole members being inserted between the reactor pressure vessel and the core shroud; vertically moved bodies respectively attached to the pole members, the vertically moved body being movable in a vertical direction; and the discharging nozzles respectively provided in the vertically moved bodies.

Since the vertically moved bodies capable of respectively and vertically moving the plurality of pole members are provided, it is possible to perform preventive maintenance work to different positions on the outer surface of the core shroud at the same time. Therefore, it is possible to further shorten the time required for the preventive maintenance work.

A ninth invention to attain the above-mentioned object is characterized by a preventive maintenance apparatus for structural members inside a reactor pressure vessel which comprises a rotating apparatus for rotating a metal fitting for bundling a plurality of hoses and a plurality of cables, the plurality of hoses and the plurality of cables being connected to the first discharging nozzle moving apparatus and the second discharging nozzle moving apparatus.

Since the rotating apparatus for rotating the metal fitting for bundling the plurality of hoses and the plurality of cables is provided, the rotating apparatus can be rotated when the turntable mounting the first discharging nozzle moving apparatus and the second discharging nozzle moving apparatus is rotated during preventive maintenance work. Therefore, it is possible to prevent the plurality of hoses and the plurality of cables from being intertwined by rotation of the turntable.

A tenth invention to attain the above-mentioned object is characterized by a preventive maintenance apparatus for structural members inside a reactor pressure vessel in which the first discharging nozzle moving apparatus and the second discharging nozzle moving apparatus respectively comprise a discharging nozzle for discharging high pressure water for adding compressive remaining stress to an outer surface of the core shroud and a discharging nozzle for discharging high pressure water for adding compressive remaining stress to an inner surface of the core shroud, and the preventive maintenance apparatus further comprises an apparatus for moving the discharging nozzles.

Since the first discharging nozzle moving apparatus and the second discharging nozzle moving apparatus respectively comprise the discharging nozzle for discharging high pressure water for adding compressive remaining stress to an outer surface of the core shroud and the discharging nozzle for discharging high pressure water for adding compressive remaining stress to an inner surface of the core shroud, it is possible to perform preventive maintenance work to four positions in the inner and outer surfaces of the core shroud at the same time. Therefore, it is possible to substantially shorten the time required for the preventive maintenance work to the core shroud.

BRIEF DESCRIPTION OF THE DRAWINGS

Other objects and advantages of the present invention will become readily apparent from the following detailed description of the preferred embodiments thereof when read reference to the drawings in which:

FIG. 7 is an enlarged view showing the discharging nozzle moving apparatus which is performing preventive maintenance work to an inner surface of the core shroud shown in FIG. 1.

DETAILED DESCRIPTION OF THE PREFERRED EMBODIMENTS

Figure 1:
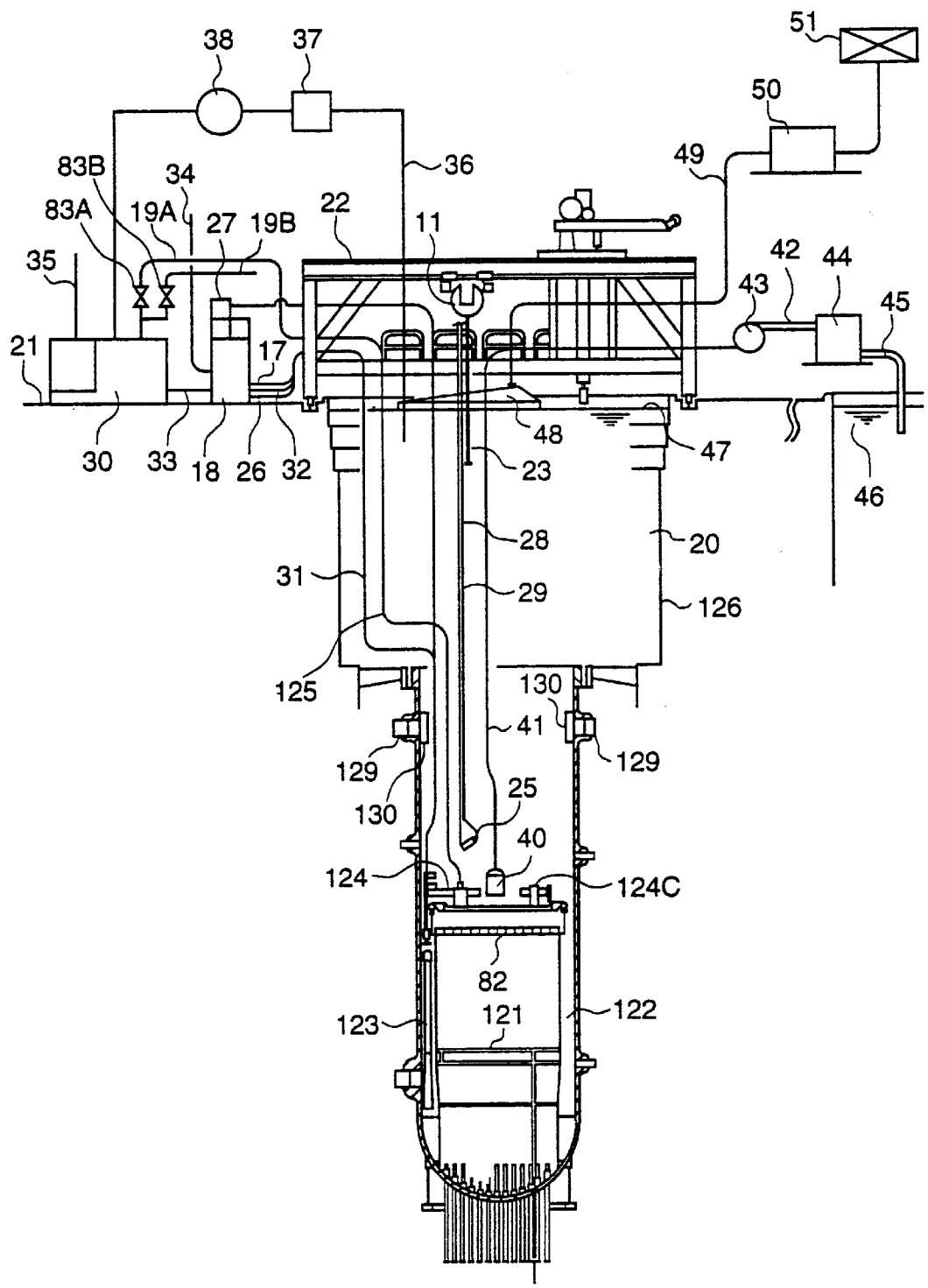
FIG. 1 is a view showing the construction of a preferred embodiment of a preventive maintenance apparatus for structural members inside a reactor vessel in accordance with the present invention.
Figure 2:
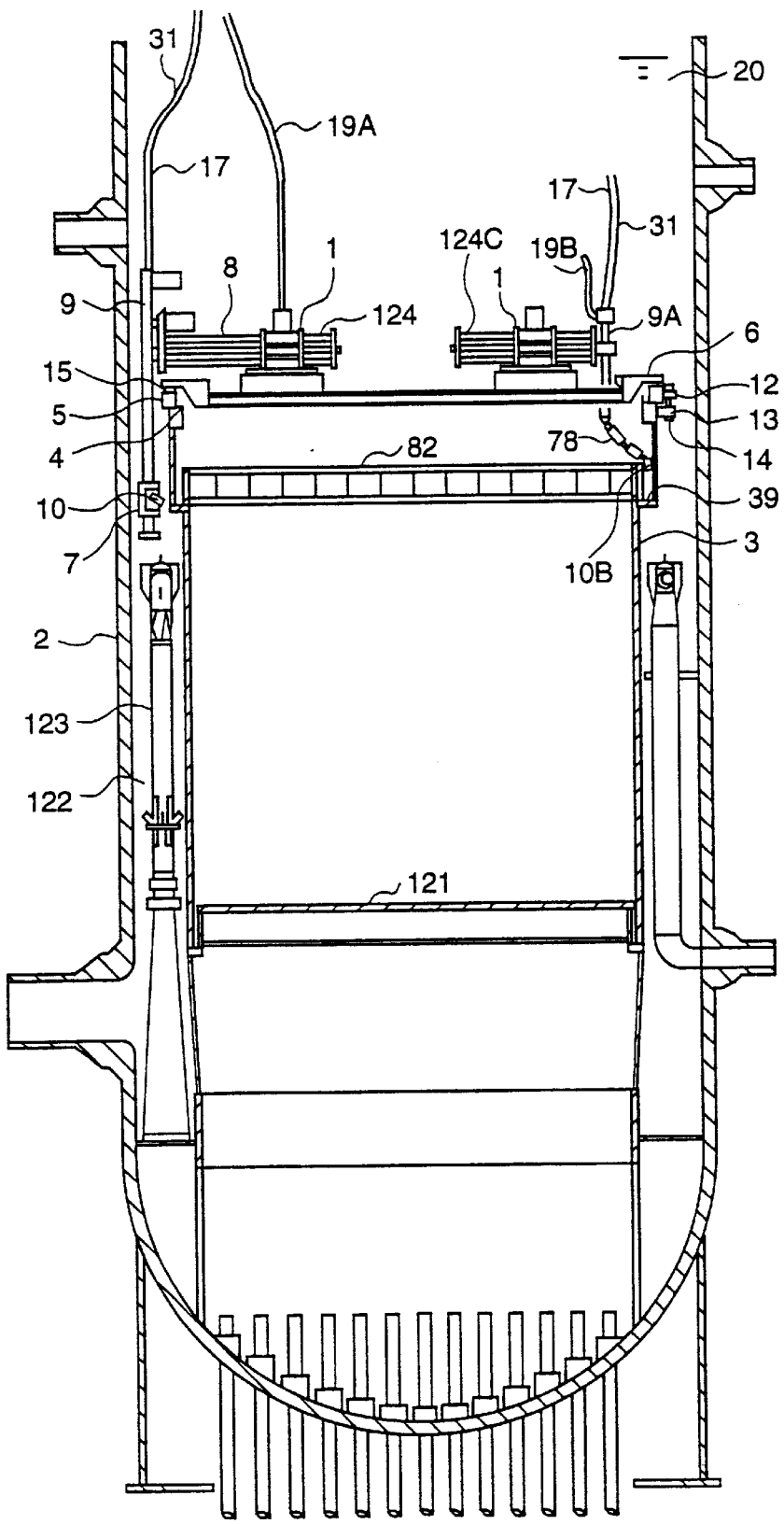
FIG. 2 is an enlarged view showing the vicinity of a core shroud shown in FIG. 1.

A preferred embodiment of a preventive maintenance apparatus for structural members inside a reactor pressure vessel (hereinafter, simply referred to as "preventive maintenance apparatus for structural members") in accordance with the present invention will be described below, referring to FIG. 1, FIG. 2, FIG. 3, FIG. 4, FIG. 5, FIG. 6 and FIG. 7.

A boiling water reactor (BWR) comprises a reactor pressure vessel 2, a core shroud 3 installed inside the reactor pressure vessel 2, an upper core grid plate 82 and a lower core support plate 121 installed inside the core shroud 3, and jet pumps 123 arranged in a ring-shaped space 122 formed between the reactor pressure vessel 2 and the core shroud 3.

The preventive maintenance apparatus for structural members in accordance with the present invention comprises a guide rail 5, a turntable 6, a control board 18, a crud collecting apparatus 41, discharging nozzle moving apparatuses 124 and 124C, and a discharged water supply apparatus 125.

Preventive maintenance work to structural members inside the reactor pressure vessel 2 using the preventive maintenance apparatus for structural members is performed while operation of the BWR is stopped. After stopping the operation of the BWR, a top head of a reactor container (dry-well) and a upper vessel head of the reactor pressure vessel 2, not shown, are removed. A steam dryer assembly and a steam separator assembly installed inside the reactor pressure vessel 2 are also detached and removed out of the reactor pressure vessel 2. A well 126 above the reactor pressure vessel 2 is filled with water. Before filling the well with water, in order to prevent water from entering into main steam pipes 129, openings of the main steam pipes 129 to the reactor pressure vessel are sealed with main steam line plugs 130 as shown in FIG. 1. All fuel assemblies, not shown, supported in the core by the upper core grid plate 82 and the lower core support plate 121 are removed out of the reactor pressure vessel 2 and temporarily stored inside a fuel storage pool 46.

In a state that the guide rail 5 mounts the turntable 6 mounting the discharging nozzle moving apparatuses 124 and 124C, the guide rail 5 is suspended by a ceiling crane, not shown, installed above an operating floor 21 inside the reactor building, and then placed on an upper flange 4 of the core shroud 3. The guide rail 5 has a fixing lug 12 in an outer peripheral surface. The lug 12 is detachably fixed to a lug 13 for fixing a shroud head, not shown, attached to the outer peripheral surface of the upper flange 4 with a bolt 14. The turntable 6 is placed so as to be rotated on the guide rail 5.

Figure 3:
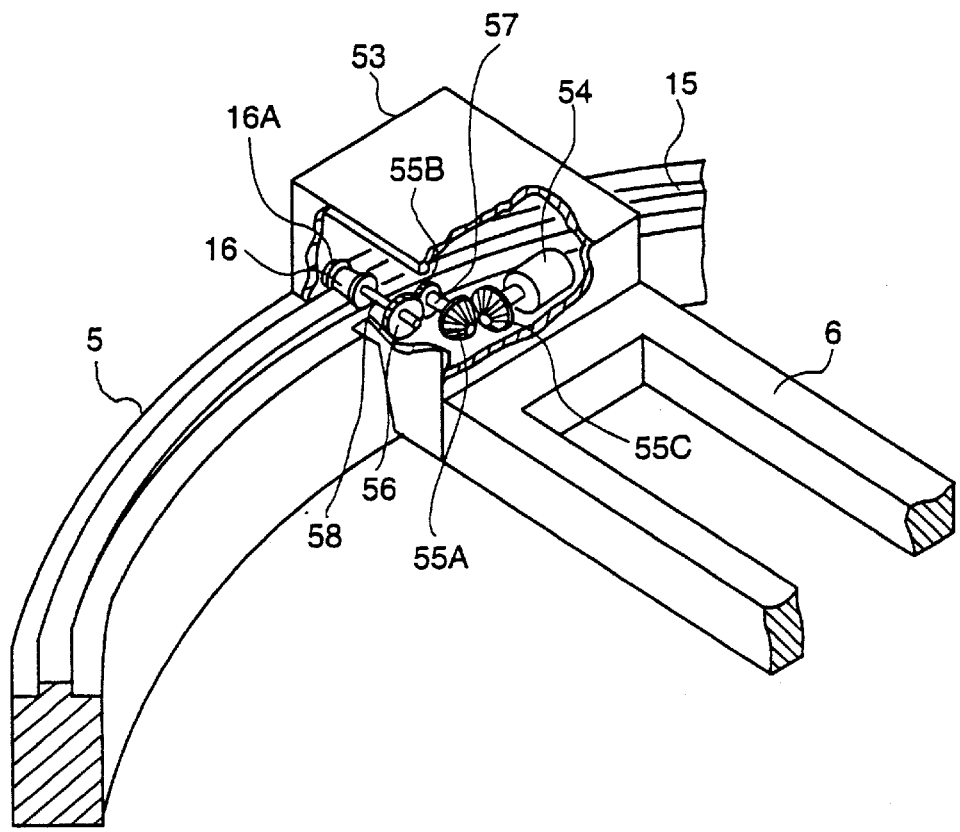
FIG. 3 is an enlarged view showing a driving portion of a turntable shown in FIG. 1.

The turntable 6 has a box 53 as shown in FIG. 3. A drive mechanism for rotating the turntable 6 is installed inside the box 53. The drive mechanism comprises a motor 54, gears 55A, 55B attached to a shaft 57 and a gear 56. The gear 55A is engaged with a gear 55C attached to a rotating shaft of the motor 54. The gear 55B is engaged with the gear 56. The gear 56 is attached to a shaft 58 of a wheel 16 rotatably attached to the turntable 6. The wheel 16 runs on a rail 15 installed on an upper surface of the guide rail 5. Since both of projecting portions 16A provided in the inner side and the outer side of the wheel 16 interpose the rail 15, the wheel 16 does not run off the rail 15 during rotating the turntable 6.

Figure 4:
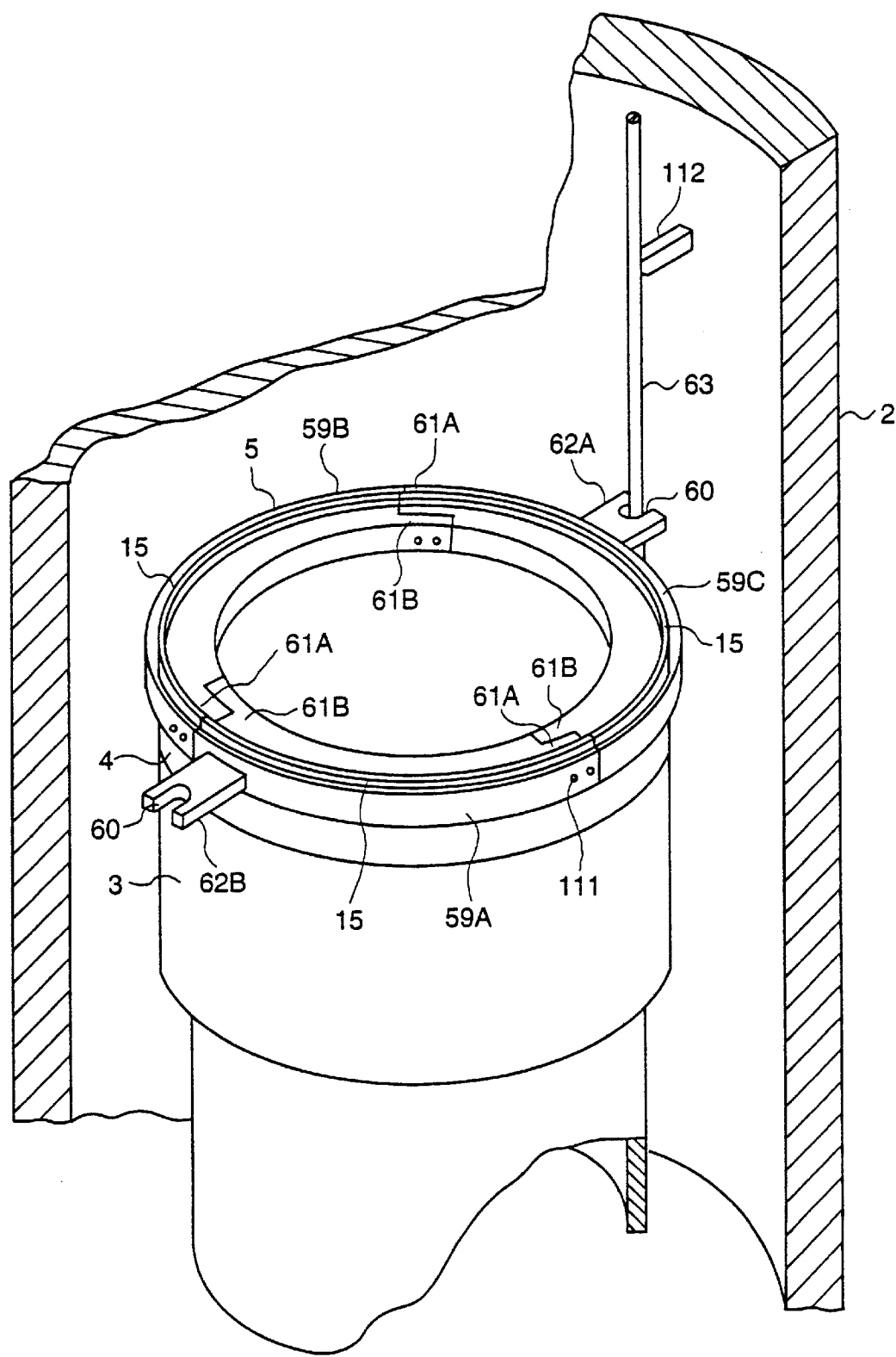
FIG. 4 is an enlarged view showing a guide rail shown in FIG. 1.

The guide rail 5 has three bent members 59A, 59B and 59C, as shown in FIG. 4. The three bent members 59A, 59B and 59C are assembled into a ring shape in the operating floor 21. The three bent members 59A, 59B and 59C are arranged in a ring shape by engaging an engaging portion 61A and an engaging portion 61B of the bent members different to each other. The engaging portion 61A and the engaging portion 61B adjacent to each other are joined together with a pin 111. A lug 62A is attached to a side surface in the outer side of the bent member 59A. A lug 62B is attached to a side surface in the outer side of the bent member 59C. Each of the lugs 62A, 62B has a cut portion 60.

The discharging nozzle moving apparatus 124 comprises an apparatus main body 1 attached to the turntable 6, an arm member 8 attached to the apparatus main body 1 movable in the horizontal direction, a pole member 9 attached to the arm member 8 and a discharging nozzle 10 provided in a vertically movable body 7 vertically moving along the pole member 9.

Figure 6:
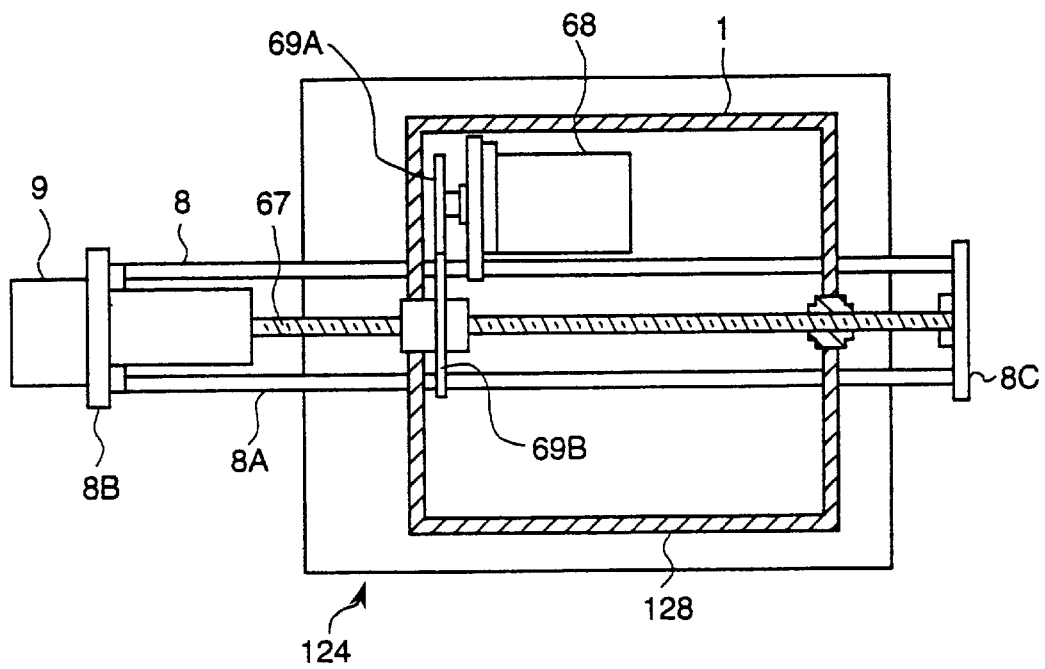
FIG. 6 is a transverse cross-sectional view showing the discharging nozzle moving apparatus shown in FIG. 5.
Figure 5:
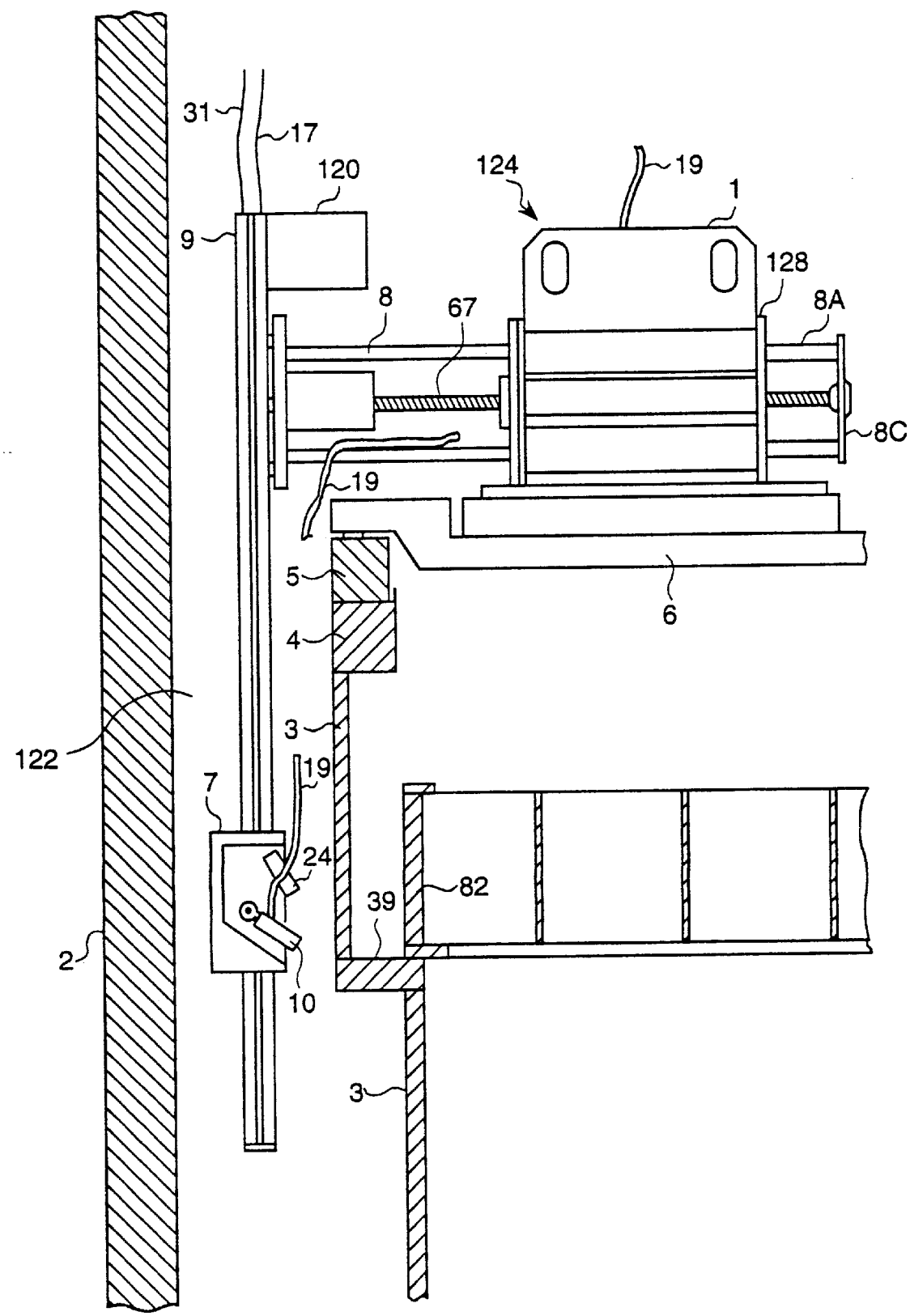
FIG. 5 is an enlarged view showing a discharging nozzle moving apparatus which is performing preventive maintenance work to an outer surface of the core shroud shown in FIG. 1.

The structure of the arm member 8 and the driving mechanism for driving the arm member 8 in the horizontal direction will be described below, referring to FIG. 5 and FIG. 6. The arm member 8 is constructed by connecting both ends of four circular rods 8A with connecting members 8B, 8C, and penetrates through a casing 128 of the apparatus main body 1. Both end portions of a pole screw 67 are supported by the connecting members 8B, 8C. The drive mechanism installed in the casing 128 has a motor 68, and gears 69A and 69B. The gear 69A is attached to a rotating shaft of the motor 68. The gear 69B is rotatably attached to the casing 128. The outer surface of the gear 69B is engaged with the gear 69A, and the inner surface of the gear 69B is engaged with the pole screw 67. A rotating force of the motor 68 is transmitted to the pole screw 67 through the gear 69A and the gear 69B to horizontally move the arm member 8 in one direction. By reversely rotating the motor 68, the arm member 8 is moved in the opposite direction. Instead of using the motor 68, the gear 69A and the gear 69B, it is possible that a cylinder may be provided in the casing 128 and the arm member 8 is moved in the horizontal direction.

A motor 120 attached to the pole member 9 rotates a pole screw, not shown, attached to the pole member 9 to vertically move the vertically moving body 7 engaging with the pole screw along the pole member 9. The discharging nozzle 10 can be operated in such actions as to be moved forward and backward to a surface of a structural member on which preventive maintenance is to be performed, rotated in the horizontal direction, and swung in the vertical direction. In order to perform the three actions described above, the discharging nozzle drive mechanism comprises dedicated motors for the individual actions. The discharging nozzle 10 may be fixed to the vertically moving body 7 so as to have a certain angle.

Figure 8:
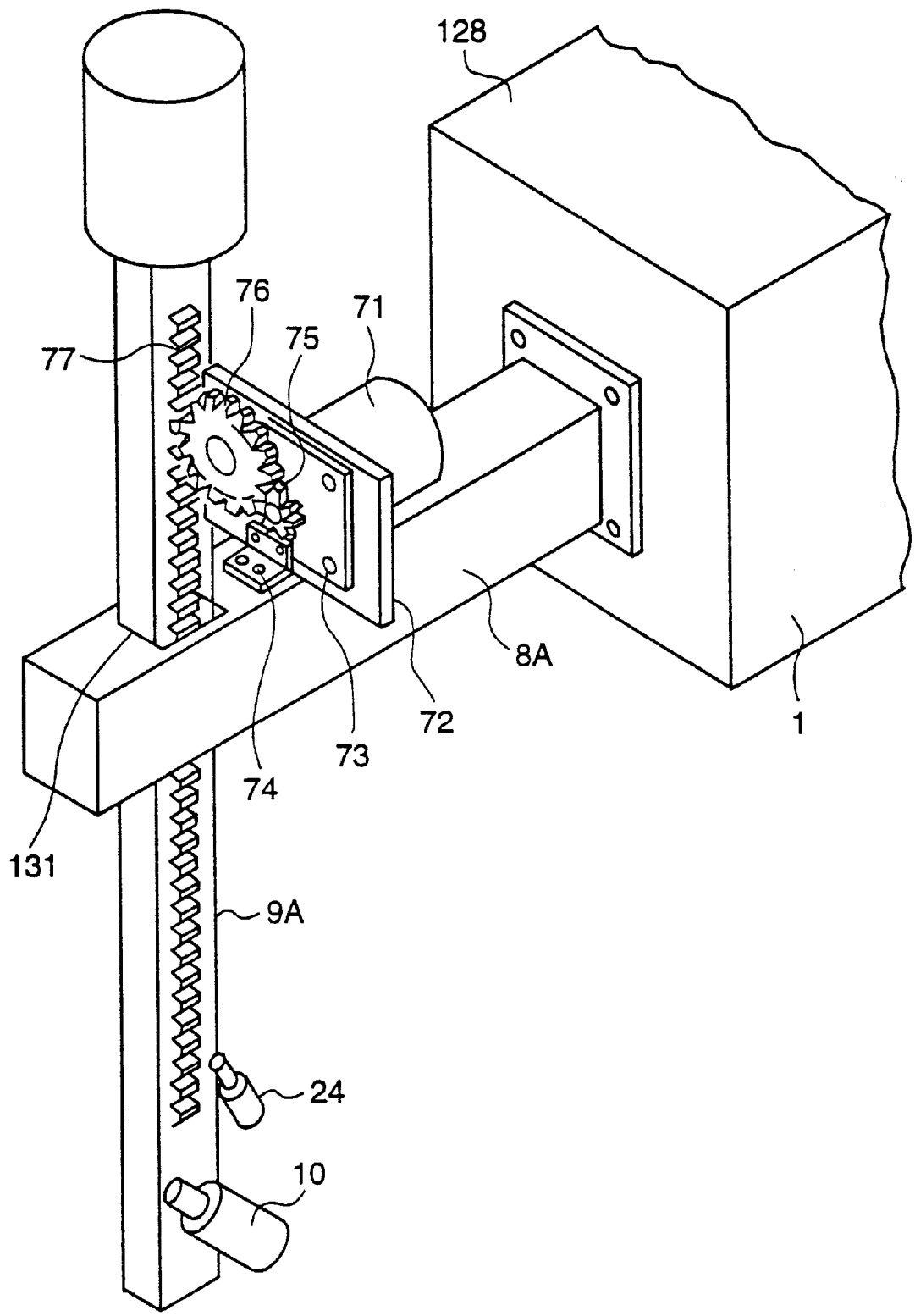
FIG. 8 is a view showing the construction of another embodiment of a driving mechanism for a pole member of the discharging nozzle moving apparatus shown in FIG. 5.

The discharging nozzle moving apparatus 124C comprises an apparatus main body 1 and an arm member 8, similarly to the discharging nozzle moving apparatus 124. The discharging nozzle moving apparatus 124C further comprises a pole member 9A inserted into a through hole (similar to a through hole 131 in FIG. 8) provided in a top end portion 8D of the arm member 8, a multi-joint arm portion 78 and a discharging nozzle 10B. The pole member 9A has a rack 77 on a side surface. A motor 71 has a drive unit for vertically moving the pole member 9A, a gear 75 and a pinion 76 engaging with the rack 77 are provided in the top end portion 8D, as shown in FIG. 8, though these are not shown in FIG. 7. The multi-joint arm portion 78 is attached to a bottom end portion of the pole member 9A with a rotating shaft 80. The multi-joint arm portion 78 is formed by jointing a plurality of arm portions 79 with the rotating shafts 80. The discharging nozzle 10B is attached to a bottom end portion of the multi-joint arm portion 78 with the rotating shaft 80. A monitoring camera, not shown, for taking a picture of preventive maintenance work is provided in the discharging nozzle 10B. Each of the arm portions 79 and the discharging nozzle 10B contains a motor, not shown, for applying a rotating force to the corresponding arm portion 79 or the corresponding discharging nozzle 10B in respect to each of the rotating shafts 80 as a center.

The discharging nozzle moving apparatuses 124 and 124C are installed on the turntable 6 in the both end portions of the turntable 6.

The discharged water supply apparatus 125 as shown in FIG. 1 comprises a high pressure pump 30, a filter 37, a recirculation pump 38, a hose 36 and high pressure hoses 19A and 19B. One end of the hose 36 is immersed into the reactor water 20 inside the well 126. The hose 36 connects the filter 37 and the recirculation pump 38 and is connected to the high pressure pump 30. The high pressure hose 19A connected to the high pressure pump 30 is once attached to the casing 128 of the apparatus main body 1 and the arm member 8, and is connected to the discharging nozzle 10. The other high pressure hose 19B connected to the high pressure pump 30 is once attached to the pole member 9A, and is connected to the discharging nozzle 10B. The filter 37 removes crud contained in the reactor water 20. The high pressure pump 30 is installed on the operating floor 21. A low pressure hose 35 connected to another water source is also connected to the high pressure pump 30. The high pressure pump 30 pumps up water supplied from either the hose 36 or the low pressure hose 35 by switching to supply the discharging nozzles 10 and 10B as the high pressure water.

The crud collecting apparatus 41 is constructed by connecting a sucking port 40, a crud transferring pump 43 and a filter 44 using a crud transfer hose 42.

The control board 18 installed on the operating floor 21 is connected to control cable 31 for transmitting and receiving electric signals by which the preventive maintenance apparatus for structural members is remotely operated, an air hose 32 for supplying air by which the preventive maintenance apparatus for structural members is remotely operated, a control cable 33 for transmitting and receiving electric signals by which the high pressure pump is remotely operated and so on. Based on the control signals transmitted through the control cables 31 and 33, the corresponding apparatuses or units are remotely controlled. These remote controls can be performed selectively by manual mode or automatic mode. The preventive maintenance work is basically performed by the automatic mode. In addition to this, the control board 18 adjusts the speed of each of the actions such as forward and backward movements, rotation and swinging of the discharging nozzle 10, and vertical movement of the vertically moving body 7.

The operating air for remotely operating the preventive maintenance apparatus for structural materials is conducted to the control board 18 from an air supply source, not shown, through an air hose 34 to control a valve inside the control board 18. By doing so, the preventive maintenance apparatus for structural materials can be remotely operated. It is also possible to operate the preventive maintenance apparatus for structural materials by supplying air to the air hose 34 from another compressor different from the air supply source described above.

Each of the motors for performing each of actions of the turntable 6, the vertically moving body 7, the arm member 8, the discharging nozzles 10, 10A and the arm member 79 and each of detectors, not shown, for detecting a rotating position and detecting a rotating speed such as potentiometers are arranged in appropriate positions in the preventive maintenance apparatus for structural materials. Measured signals of these detectors are transmitted to the control board 18 through the control cable 17. During preventive maintenance work, a computer, not shown, incorporated in the control board 18 calculates an optimum condition to a traveling speed of the discharging nozzle 10 and a discharging position (vertical position, rotating position, swinging angle), and transmits each of the control signals to each of the corresponding motors through the control cables 31 and 33. The computer also calculates an optimum condition to a traveling speed of the discharging nozzle 10B and a discharging position (vertical position, rotating position, swinging angle), and transmits each of the control signals to each of the corresponding motors through the control cables 31 and 33.

When preventive maintenance work is performed to the core shroud 3, the preventive maintenance apparatus for structural materials is set onto the upper flange 4. This setting work will be described below. The guide rail 5 is assembled into a ring shape on the operating floor 21. The turntable 6 is set on the guide rail 5, and the discharging nozzle moving apparatuses 124 and 124C are mounted on the turntable 6. After assembling the guide rail 5, the turntable 6 and the discharging nozzles 124 and 124C in a unit, the guide rail 5 is hung down inside the reactor pressure vessel 2 using the ceiling crane described above. As shown in FIG. 4, the two guide rods 63 are set to the inner surface of the reactor pressure vessel 2 by supporting members 112 spaced apart by 180°. The cut portion 60 of the lug 62A provided on the guide rail 5 is engaged with the guide rod 63. The cut portion 60 of the lag 62B is is engaged with the other one of the guide rods 63 not shown in the figure. The guide rail 5 is lowered on the upper flange 4 along the two guide rods 63. After that, the guide rail 5 is detachably attached to the upper flange 4 with bolts 14. Since the guide rail 5 is lowered on the upper flange 4 along the two guide rods 63, the guide rail 5 can be lowered without interference with the main steam line plugs 130.

The work of setting the guide rail 5 on the upper flange 4 is performed by picture-taking using the monitoring camera 24 attached to the vertically moving body 7 and a monitoring camera 25 hung inside the reactor pressure vessel 2 by the cables 28, 29, and monitoring the pictures displayed on a monitor 27 placed in the control board 18. The images taken by the monitoring camera 25 is transmitted to the monitor 27 through the cable 26. The work setting the guide rail 5 and the turntable 6 onto the upper flange 4 is monitored by the picture from the monitoring camera 25. Moving of the monitoring camera 25 is performed by a worker from a refueling machine 22. The worker moves the monitoring camera 25 by operating cables 28, 29.

Description will be made below in a case where preventive maintenance work is performed to welded portions in the outer surface and the inner surface of the core shroud 3. The pole member 9 of the discharging nozzle moving apparatus 124 is inserted into the ring-shaped space 122. The vertically moving body 7 is moved by driving of the motor 120. The discharging nozzle 10 is positioned to a welded portion or which preventive maintenance work is to be performed from the outside of the core shroud 3. On the other hand, the discharge nozzle 10B is inserted into the narrow portion between the core shroud 3 and the upper core grid plate 82 by lowering of the pole member 9A and rotation of each of the arm portions 79 around the rotating shaft 80 as a center by driving of each of the motors contained in each of the arm portions 79.

By driving the recirculation pump 38, the reactor water 20 is cleaned by the filter 37, and then transferred to the high pressure pump 30. The high pressure water pressurized by the high pressure pump 30 and sent through the high pressure hose 19A is discharged out of the discharging nozzle 10 from the outside of the core shroud 3 to a welded portion on which preventive maintenance work is to be performed. Cavitation bubbles are generated by a pressure difference and a shear action between the discharged water flow from the discharging nozzle 10 and the environmental reactor water 20. The cavitation bubbles move toward the welded portion together with the discharged water flow. The cavitation bubbles are collapsed on the surface of the welded portion and the surrounding vicinity. The impulsive pressures generated by the collapse of the cavitation bubbles reach the surface of the welded portion to convert the tensile remaining stress in the surface to a compressive remaining stress. Since the compressive remaining stress is added to the outside surface of the welded portion, it is possible to prevent occurrence of stress corrosion cracks in the welded portion. The discharging nozzle 10 discharges the discharged water flow while being moved zigzag near the welded portion over all the circumference of the welded portion in the circumferential direction by vertical movement of the vertically moving body 7 by the driving of the motor 120 and rotation of the turntable 6. Therefore, the compressive remaining stress is added over all the circumference of the outside surface portion of the welded portion, and it is possible to prevent occurrence of stress corrosion crack in the welded portion.

Similarly, the high pressure water conducted through the high pressure hose 19B is discharged out of the discharging nozzle 10B from the inside of the core shroud 3 to the welded portion on which preventive maintenance work is to be performed. The compressive remaining stress is added over the inside surface portion of the welded portion by the collapse of the cavitation bubbles. By vertical movement of the pole member 9A and rotation of the turntable 6, the compressive remaining stress is added over all the circumference of the inside surface portion of the welded portion.

In this embodiment, since the discharging nozzles 10 and 10B are used, the compressive remaining stress can be added to the welded portion from the inside and the outside of the core shroud 3 at the same time. Therefore, the preventive maintenance work to the core shroud 3 can be completed in a short time. In a case where the preventive maintenance work from either the inside surface or the outside surface is not required, one of the valve 83A arranged in the high pressure hose 19A or the valve 83B arranged in the high pressure hose 19B (FIG. 1) not corresponding to the surface to be performed with the preventive maintenance work is closed to stop supplying of high pressure water to one of the discharging nozzles.

The discharging nozzle moving apparatus 124 in this embodiment may be constructed in such a structure that the pole member 9 is vertically moved by providing a motor 71, a gear 75, a pinion 76 and a rack 77, as shown in FIG. 8 to be described later. The arm member 8 has a through hole into which the pole member 9 is to be inserted. The motor 71 is operated when the pole member 9 is lowered inside the ring-shaped space 122 after the discharging nozzle moving apparatus 124 is set in the turntable 6. Vertical movement of the discharging nozzle 10 near the welded portion during the preventive maintenance work is performed by vertical movement of the vertically moving body 7 using the motor 120.

By the action of the impulsive pressure generated at collapsing of the cavitation bubbles, crud (the main component is radioactivated iron oxide) attached near the welded portion is peeled off and suspended in the reactor water 20. A crud transfer pump 43 is operated during the preventive maintenance work. A sucking port 40 is arranged at a place performing the preventive maintenance work. The reactor water 20 containing the crud is sucked through the sucking port 40, and transferred to the filter 44 through the crud transfer hose 42. The crud is removed by the filter 44, and the cleaned reactor water 20 is discharged into the fuel storage tank 46 out of the hose 45. Crud is settled out and accumulated mainly in a core shroud flange portion 39. This crud is sucked through the sucking port 40 and removed by the filter 44 before initiating the preventive maintenance work.

Since the accumulated crud and the crud peeled off during the preventive maintenance work can be removed from the reactor water 20 by the crud collecting apparatus 41, problems in the visibility of the monitoring cameras 24, 25 caused by suspending crud can be solved. Therefore, progress of the preventive maintenance work can be monitored under a good condition based on the pictures from the monitoring cameras 24, 25. In addition to this, since diffusion of the crud can be suppressed, radiation exposure during the preventive maintenance work can be reduced. Radioactive contamination of the reactor water can be also suppressed.

The filter 44 having captured the crud is enclosed in a drum having a radiation shield or the like as a high level radioactive waste to be stored in a nuclear power plant site.

Part of the cavitation bubbles rise up to the water surface 47 without collapsing. These bubbles contain radioactivated crud. When these bubbles collapse on the reactor water surface 47, the crud is dispersed and accordingly there is a possibility to expand a radioactive contamination area. In order to prevent expansion of the radioactive contamination area, the reactor water surface 47 is covered with an air collecting cover 48. The bubbles having risen up to the reactor water surface 47 are collected by the air collecting cover 48, and transferred to a filter 50 through a transfer hose 49. The filter captures dust and mist. The gas cleaned by the filter 50 is exhausted to a ventilating and air conditioning exhaust duct 51 existing in the reactor building. The filter 52 having captured the dust and the mist is enclosed in a drum having a radiation shield or the like as a high level radioactive waste to be stored in a nuclear power plant site.

By setting the air collecting cover 48, it is possible to suppress dispersion of radioactive substances to the zone above the operating floor 21. Therefore, it is possible to reduce radiation exposure to workers in the operating floor 21.

When it is required to exchange the discharging nozzle 10 of the discharging nozzle moving apparatus 124 or the discharging nozzle 10B of the discharging nozzle moving apparatus 124C, the discharging nozzle moving apparatus 124 or the discharging nozzle moving apparatus 124C is detached from the turntable 6 using a tong from the operating floor 21. The detached discharging nozzle moving apparatus is hung by a wire loop 23 and lifted up to the operating floor 21 using a hoist crane 11 of the refueling machine 22. The discharging nozzle moving apparatus after having exchanged the discharging nozzle is hung and lowered using the hoist crane 11 to be set on the turntable 6.

In the present embodiment, since the discharging nozzle 10 can be continuously moved around the core shroud 3 by rotating the turntable 6, it is unnecessary to dismount and mount the discharging nozzle moving apparatuses 124 and 124C when the discharging nozzle 10 can be moved around the core shroud 3. Therefore, the time required to perform the preventive maintenance work using the discharge nozzle 10 can be shortened. Further, since the discharging nozzle moving apparatus 124 is set on the upper flange 4 through the guide rail 5 and the turntable 6, the length of the pole member 9 can be shortened. Therefore, the discharging nozzle moving apparatus 124 becomes easy to be handled when it is set onto the turntable 6, and the pole member 9 can be easily inserted inside the narrow ring-shaped space 122.

Since the discharging nozzle moving apparatus 124C in this embodiment has the multi-joint arm portion 78, the discharging nozzle 10B can be easily inserted into the annular narrow portion or space between the core shroud 3 and the upper core grid plate 82. Therefore, it is possible to easily perform the preventive maintenance work to the inside of the welding portion of the core shroud 3 in the narrow portion.

In this embodiment, since the turntable 6 is not moved directly on the upper flange 4 but on the guide rail 5 arranged on the upper flange 4, the upper flange 4 cannot be damaged by moving of the turntable 6. Further, the guide rail 5, the turntable 6 and the discharging nozzle moving apparatuses 124 and 124C are integrated into a unit in which the discharging nozzle moving apparatuses 124 and 124C are in a state of being mounted on the turntable 6, and then the unit is lowered onto the upper flange. Therefore, the discharging nozzle moving apparatuses 124 and 124C can be set on the upper flange at the same time. Compared to a case where the discharging nozzle moving apparatuses 124 and 124C are separately set onto the turntable 6 placed in the reactor pressure vessel 2, the guide rail 5, the turntable 6 and the discharging nozzle moving apparatuses 124 and 124C can be set onto the upper flange 4 in a shorter time.

The structure of the pole member 9 and the vertically moving body 7 in the discharging nozzle moving apparatus 124 of the preventive maintenance apparatus for structural members in the embodiment described above may be modified as shown in FIG. 8. This structure will be described below.

An arm member 8A penetrating a casing 128 has a through hole 131 in the top end portion. A pole member 9A extending in the vertical direction is vertically moved in the through hole 131. A mounting plate 72 is attached to the arm member 8A with bolts and nuts 74. A motor 71 is attached to the mounting plate 72 with bolts and nuts 73. A pinion 76 is also rotatably attached to the mounting plate 72. A gear 75 attached to a rotating shaft of the motor 71 is engaged with the pinion 76. The pinion 76 is engaged with a rack 77 provided in the pole member 9A. A discharging nozzle 10 and a monitoring camera 24 are arranged on a bottom end portion of the pole member 9A. A rotating force of the motor 71 is transmitted to the pinion 76 to vertically move the pole member 9A. In the structure of FIG. 8, the discharging nozzle 10 is vertically moved by the motor 71 during preventive maintenance work.

Figure 9:
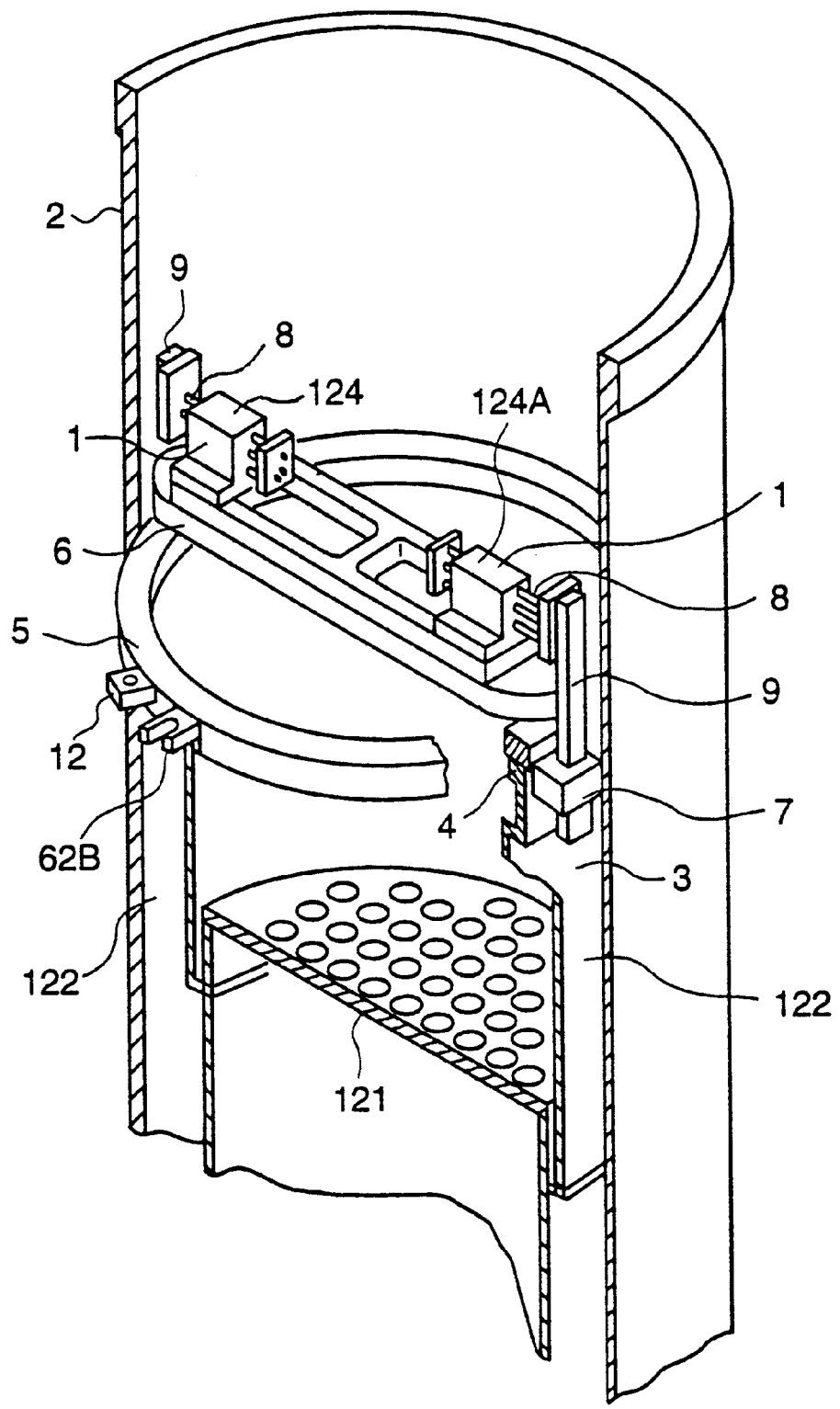
FIG. 9 is a view showing the construction of another embodiment of a preventive maintenance apparatus for structural members inside a reactor pressure vessel in accordance with the present invention.

Another embodiment of a preventive maintenance apparatus for structural members in accordance with the present invention will be described below, referring to FIG. 9. The preventive maintenance apparatus for structural members of this embodiment comprises a guide rail 5, a turntable 6, a control board 18, a crud collecting apparatus 41, and discharging nozzle moving apparatuses 124 and 124A. The same components in this embodiment as in the embodiment of FIG. 1 are indicated by the same reference characters. This embodiment has the discharging nozzle moving apparatus 124A instead of the discharging nozzle moving apparatus 124C in the embodiment of FIG. 1. The discharging nozzle moving apparatus 124A has the same construction as the discharging nozzle moving apparatus 124. The discharging nozzle moving apparatuses 124 and 124A are set onto the turntable 6 on both end portions of the turntable 6. Each of the pole members 9 of the discharging nozzle moving apparatuses 124 and 124A is inserted into the ring-shaped space 122. In this embodiment, by arranging the discharging nozzle moving apparatuses 124 and 124A on both end portions of the turntable 6, the preventive maintenance work to the outside surface of the core shroud 3 using the discharging nozzle moving apparatus 124 described in the embodiment of FIG. 1 can be performed at two positions on the core shroud 3 spaced apart by 180° at the same time also using the discharging nozzle 10 of the discharging nozzle moving apparatus 124A.

In this embodiment, when the preventive maintenance work is performed to the inside surface of the core shroud 3 in the narrow portion between the core shroud 3 and the upper core grid plate 82, the discharging nozzle moving apparatuses 124 and 124A are detached from the turntable 6 using the tong, as described above. Then, the discharging nozzle moving apparatuses are successively lifted up to the operating floor 21 using the hoist crane 11. Instead, two discharging nozzle moving apparatuses 124C are lowered and set on the turntable 6. Each of the discharging nozzles 10B of the discharging nozzle moving apparatuses 124C is inserted into the narrow portion by operating the pole member 9A and the multi-joint arm portion 78. By using the two discharging nozzle moving apparatuses 124C, the preventive maintenance work to the inside surface of the core shroud 3 using the discharging nozzle moving apparatus 124C described in the embodiment of FIG. 1 can be performed at two positions on the core shroud 3 spaced apart by 180° at a time.

This embodiment can attain the same effect as that attained in the embodiment of FIG. 1. However, compared to the embodiment of FIG. 1, this embodiment needs to additionally prepare the discharging nozzle moving apparatus 124 and the discharging nozzle moving apparatus 124C by one more each. Further, this embodiment requires work to exchange between the discharging nozzle moving apparatuses 124 and the discharging nozzle moving apparatuses 124C.

Figure 10:
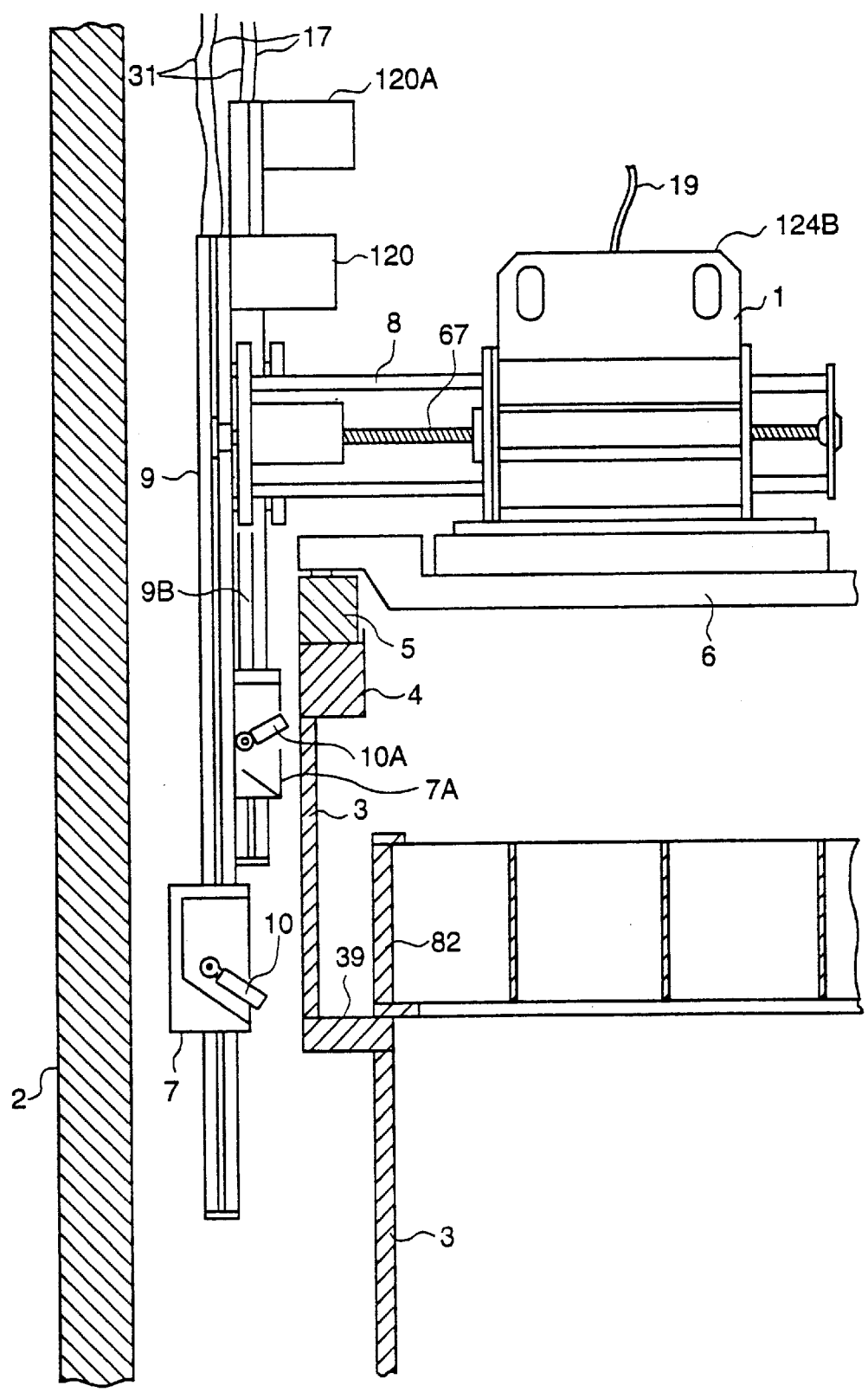
FIG. 10 is a view showing the construction of another embodiment of a discharging nozzle moving apparatus used in a preventive maintenance apparatus for structural members inside a reactor pressure vessel in accordance with the present invention, wherein the preventive maintenance apparatus is performing preventive maintenance work to an outer surface of the core shroud.

A further embodiment of a preventive maintenance apparatus for structural members in accordance with the present invention will be described below, referring to FIG. 10. The preventive maintenance apparatus for structural members of this embodiment is different from the embodiment of FIG. 1 in that a discharging nozzle moving apparatus 124B is provided instead of the discharging nozzle moving apparatus 124. The other constructions of this embodiment are the same as those in the embodiment of FIG. 1. The discharging nozzle moving apparatus 124B is constructed by further adding a vertically moving body 7A, a pole member 9B, a discharging nozzle 10A and a motor 120A to the construction of the discharging nozzle moving apparatus 124. The pole member 9B is installed in the arm member 8 so as to be in parallel to the pole member 9. The vertically moving body 7A is vertically moved by the motor 120A similarly to the vertically moving body 7. The discharging nozzle 10A is fixed to the vertically moving body 7A at a preset angle so as to be directed upward. In this embodiment, the discharging nozzle 10 is fixed to the vertically moving body 7 at a preset angle so as to be directed downward. In this embodiment, the preventive maintenance work is performed using the discharging nozzles 10, 10A. At that time, the discharging nozzles 10 and 10A perform the preventive maintenance work to different positions in the vertical direction of the core shroud 3. Since this embodiment can perform the preventive maintenance work to a plurality of positions at the same time, the time required for the work can be shortened.

A still further embodiment of a preventive maintenance apparatus for structural members in accordance with the present invention will be described below, referring to FIG. 11. The preventive maintenance apparatus for structural members of this embodiment is different from the embodiment of FIG. 1 in that a discharging nozzle moving apparatus 124D is provided instead of the discharging nozzle moving apparatus 124. The other constructions of this embodiment are the same as those in the embodiment of FIG. 1. Spray headers 83A, 83B of a core spray system are installed in the inside surface of the core shroud 3 under the upper flange 4.

The discharging nozzle moving apparatus 124D comprises a horizontal arm 90, a box 91 and a rotating cover 93 instead of the multi-arm portion 78 in the discharging nozzle moving apparatus 124C. The horizontal arm 90 is attached to a bottom end portion of the pole member 9A. The box 91 is attached to the horizontal arm 90. The rotating cover 93 is rotatably attached to the box 91. The discharging nozzle 10B is attached to the top end portion of the rotating cover 93. When a motor 92 provided in the horizontal arm 90 is operated, a gear, not shown, is rotated to move the rotating cover 93 in directions indicated by an arrow 94.

Figure 11:
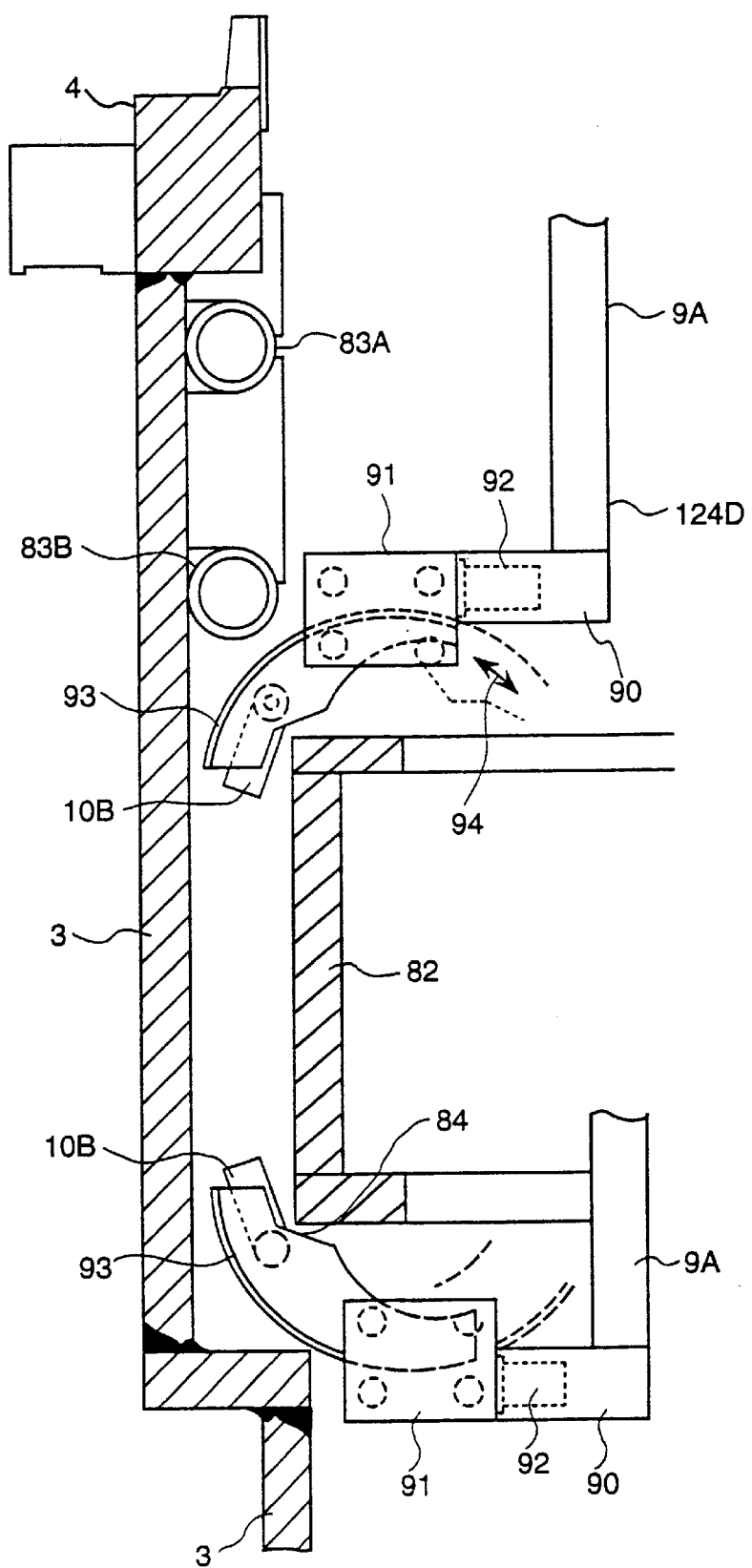
FIG. 11 is a view showing the construction of another embodiment of a discharging nozzle moving apparatus used in a preventive maintenance apparatus for structural members inside reactor pressure vessel in accordance with the present invention, wherein the preventive maintenance apparatus is performing preventive maintenance work to an inner surface of the core shroud.

By lowering the pole member 9A and rotating the rotating cover 93 toward the left hand side in FIG. 11, the discharging nozzle 10B is inserted into the narrow portion between the core shroud 3 and the upper core grid plate 82. The preventive maintenance work to the inside surface of the core shroud 3 can be performed by discharging high pressure water out of the discharging nozzle 10B. As described above, the preventive maintenance work to the inside surface of the core shroud 3 can be performed from a portion above the upper core grid plate 82.

In this embodiment, the preventive maintenance work to the inside surface of the core shroud 3 can be also performed from a portion below the upper core grid plate 82. The pole member 9A is lowered in the upper core grid plate 82. When the horizontal arm 90 reaches the bottom end portion of the upper core grid plate 82, lowering of the pole member 9A is stopped. The box 91 is rotated by a motor, not shown, so that the discharging nozzle 10B is directed upward. By rotating the rotating cover 93, the discharging nozzle 10B is inserted into the narrow portion from an opening 84 formed in the bottom end portion of the upper core grid plate 82. Under this state, high pressure water hits onto the inside surface of the core shroud 3 from the lower side.

This embodiment can attain the same effect as that attained in the embodiment of FIG. 1. Further, the present embodiment can also perform preventive maintenance work to the inside surface of the core shroud 3 from the bottom end portion in the narrow portion.

Figure 12:
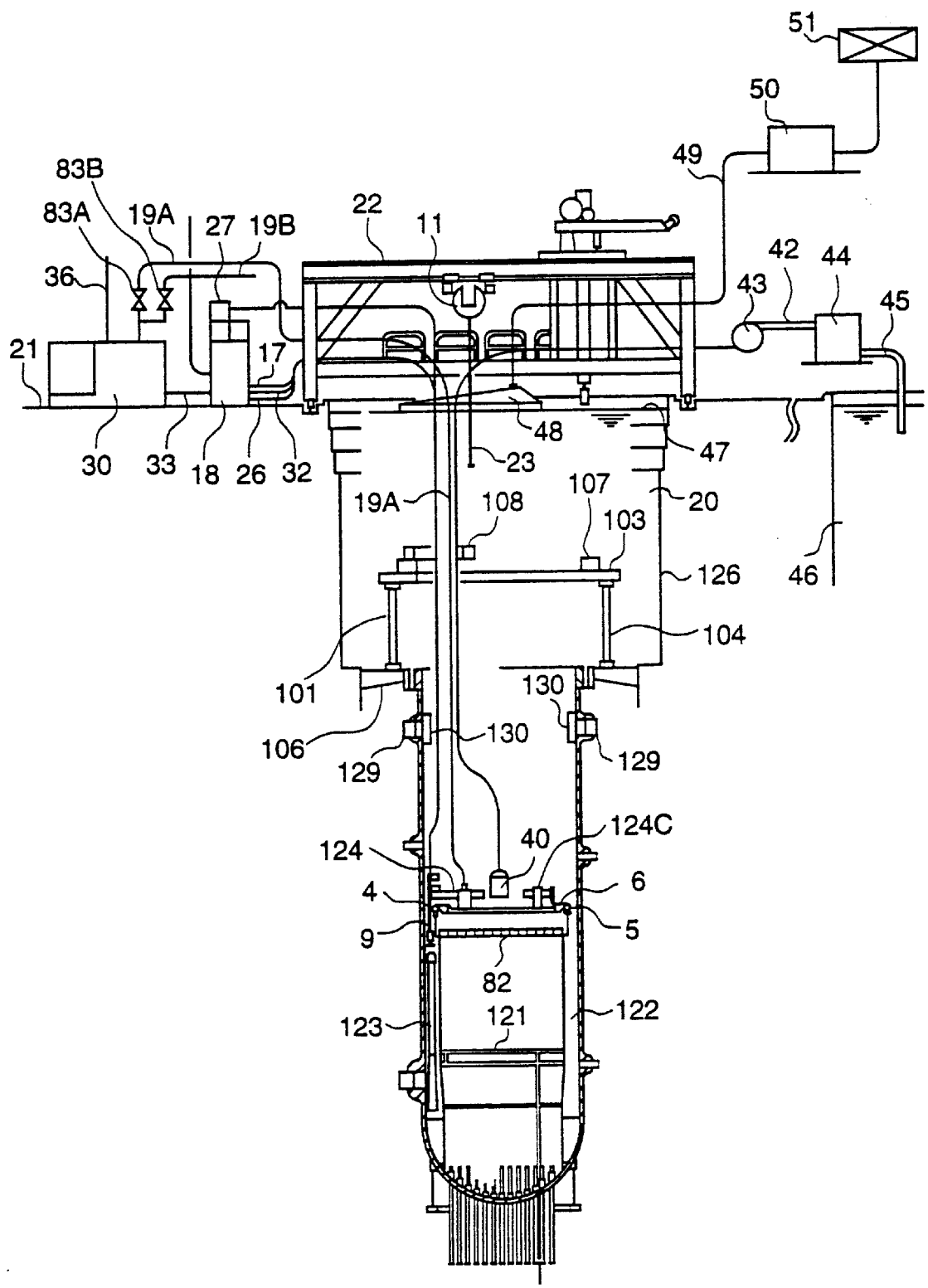
FIG. 12 is a view showing the construction of another embodiment of a preventive maintenance apparatus for structural members inside a reactor pressure vessel in accordance with the present invention.

A further embodiment of a preventive maintenance apparatus for structural members in accordance with the present invention will be described below, referring to FIG. 12. This embodiment is constructed by further adding a rotating apparatus 101 to the construction of the embodiment of FIG. 1. The rotating apparatus 101 comprises a table 103 for rotation, a ring 107 and a fixing metal fitting 108. The table 103 for rotation is set on a bulk head plate 106 in the reactor well 126 through legs 104. The ring 107 is mounted on the table 103 for rotation through roller bearings. The ring 107 is rotatable on the table 103 for rotation. The fixing metal fitting 108 is composed of two half-divided parts which are joined together and attached to the ring 107. The fixing metal fitting 108 bundles the high pressure hoses 19A, 19B connected to the discharging nozzle moving apparatuses 124 and 124C and the various kinds of cables such as the control cable 31 and so on. When the turntable 6 is rotated during preventive maintenance work using the discharging nozzle moving apparatuses 124 and 124C, the ring 107 is also rotated in the same direction together with the rotation of the turntable 6.

This embodiment can attain the same effect as that attained in the embodiment of FIG. 1. Further, since the fixing metal fitting 108 bundles the hoses and the control cable and is rotated in the same direction as the rotation of the turntable 6, it is possible to prevent the hoses and the cables from being intertwined by performing the preventive maintenance work.

Figure 13:
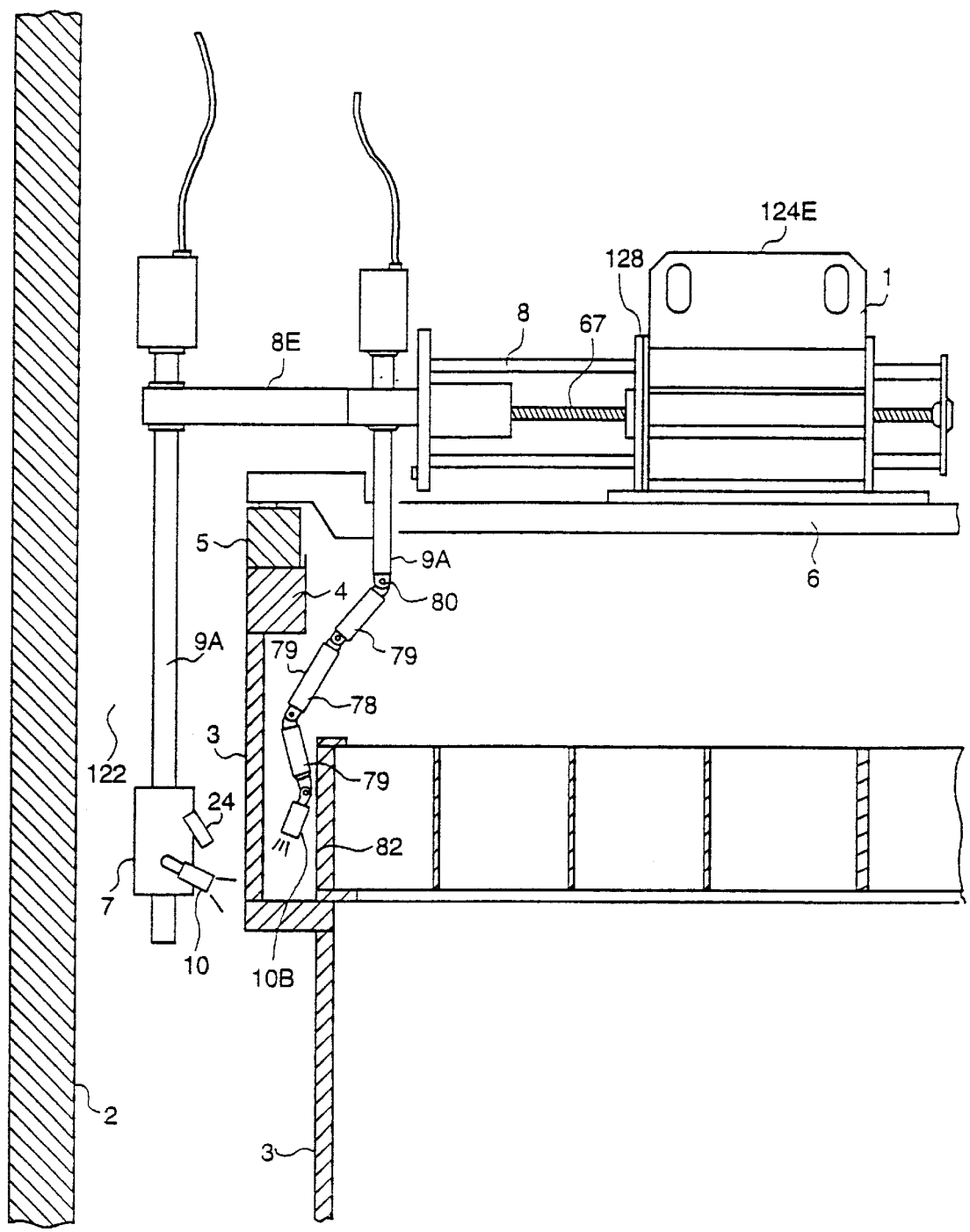
FIG. 13 is a view showing the construction of another embodiment of a discharging nozzle moving apparatus used in a preventive maintenance apparatus for structural members inside a reactor pressure vessel in accordance with the present invention.

A still further embodiment of a preventive maintenance apparatus for structural members in accordance with the present invention will be described below, referring to FIG. 13. In this embodiment, two discharging nozzle moving apparatuses 124E are mounted in both end portions of the turntable 6 instead of the discharging nozzle moving apparatuses 124 and 124C in the embodiment of FIG. 1. In the discharging nozzle moving apparatus 124E, two pole members 9A are attached to a top end portion 8E of the arm member 8 in such a manner as to be slidable in the vertical direction. One of the pole members 9A is inserted into the ring-shaped space 122. Similar to the discharging nozzle moving apparatus 124, a vertically moving body 7 having a discharging nozzle 10 is attached to the pole member 9A in such a manner as to be movable in the vertical direction. A multi-joint arm 78 similar to that in the discharging nozzle moving apparatus 124C is attached to the other pole member 9A with a rotating shaft 80. A discharging nozzle 10B is provided in a top end portion of the multi-joint arm 78.

This embodiment can attain the same effect as that attained in the embodiment of FIG. 1. Further, the present embodiment can perform preventive maintenance work to both the inside surface and the outside surface of the core shroud 3 at the same time by the one discharging nozzle moving apparatus 124E. Since this embodiment comprises two sets of such discharging nozzle moving apparatuses 124E, the time required for the preventive maintenance work to the core shroud 3 can be shortened compared to that in the embodiment of FIG. 1.

What is claimed is:

1. A method of performing maintenance on a structural member inside a reactor pressure vessel comprising the steps of:

lowering an annular guide rail having a second lug until said guide rail rests on an upper flange of a core shroud provided inside a reactor pressure vessel;

detachably mounting said second lug of said guide rail to a first lug, mounted on said core shroud;

mounting a turntable on said guide rail so as to be movable on said guide rail;

mounting a discharging nozzle moving apparatus on said turntable, said discharging nozzle moving apparatus having a multi-joint arm which can insert a discharging nozzle into a narrow space between said core shroud and an upper core grid plate;

positioning said discharging nozzle at a position at which compressive remaining stress is added to a surface of said core shroud in a radial direction and an axial direction of said core shroud by said discharging nozzle moving apparatus; and discharging water to add compressive remaining stress to a surface of said core shroud from said discharging nozzle.

2. A method of performing maintenance on a structural member inside a reactor pressure vessel according to claim 1, wherein said step of lowering the guide rail is done after a plurality of third lugs on said guide rail are engaged with a plurality of guides provided inside said reactor pressure vessel.

3. A method of performing maintenance on a structural member inside a reactor pressure vessel according to claim 1, wherein reactor water inside said reactor pressure vessel is cleaned and utilized as supply water for said discharging nozzle.

4. A method of performing maintenance on a structural member inside a reactor pressure vessel according to claim 1, wherein crud suspended in the reactor water inside said reactor pressure vessel is sucked up and removed from said reactor pressure vessel.

5. A method of performing preventive maintenance on a structural member inside a reactor pressure vessel comprising the steps of:

lowering an annular guide rail having a second lug to an upper flange of a core shroud provided inside said reactor pressure vessel;

detachably mounting said second lug of said guide rail to a first lug for mounting a shroud head, mounted on said core shroud;

mounting a turntable on said guide rail so as to be movable on said guide rail;

mounting a first discharging nozzle moving apparatus and a second discharging nozzle moving apparatus on said turntable, said first discharging nozzle moving apparatus having a multi-joint arm which can insert a first discharging nozzle into a narrow space between said core shroud and an upper core grid plate;

positioning said first discharging nozzle at a position at which compressive remaining stress is added to an outer surface of said core shroud in a radial direction and an axial direction of said core shroud in a region between said reactor pressure vessel and said core shroud by said first discharging nozzle moving apparatus;

positioning a second discharging nozzle at a position at which compressive remaining stress is added to an inner surface of said core shroud in a radial direction and an axial direction of said core shroud by said second discharging nozzle moving apparatus;

discharging water for adding compressive remaining stress to the outer surface of said core shroud from said first discharging nozzle; and discharging water for adding compressive remaining stress to the inner surface of said core shroud from said second discharging nozzle.

6. A method of performing preventive maintenance on a structural member inside a reactor pressure vessel according to claim 5, wherein said step of lowering the guide rail is done after a plurality of third lugs on said guide rail are engaged with a plurality of guides provided inside said reactor pressure vessel.

7. A method of performing preventive maintenance on a structural member inside a reactor pressure vessel according to claim 5, wherein reactor water inside said pressure vessel is cleaned and utilized as supply water for said discharging nozzle.

8. A method of performing preventive maintenance on a structural member inside a reactor pressure vessel according to claim 5, wherein crud suspended in the reactor water inside said reactor pressure vessel is sucked up and removed from said reactor pressure vessel.

9. A method of performing maintenance on a structural member inside a reactor pressure vessel comprising the steps of:

lowering an annular guide rail onto an upper flange of a core shroud provided inside said reactor pressure vessel;

detachably mounting said guide rail to said core shroud;

mounting a turntable on said guide rail so as to be movable on said guide rail;

mounting a discharging nozzle moving apparatus on said turntable, said discharging nozzle moving apparatus having an arm which can insert a discharging nozzle into a narrow space between said core shroud and an upper core grid plate;

positioning said discharging nozzle at a position at which compressive remaining stress is added to a surface of said core shroud in a radial direction and an axial direction of said core shroud by said discharging nozzle moving apparatus; and discharging water to add compressive remaining stress to a surface of said core shroud from said discharging nozzle.

10. A method of performing maintenance according to claim 9, wherein said step of lowering said guide rail is effected after performing said step of mounting said turntable thereon and said step of mounting said discharging nozzle moving apparatus, and said guide rail is lowered while being guided by guide rods separated from each other and each fixed to the reactor pressure vessel.

11. A method of performing maintenance on a structural member inside a reactor pressure vessel comprising the steps of:

lowering an annular guide rail onto an upper flange of a core shroud provided inside said reactor pressure vessel;

detachably mounting said guide rail to said core shroud;

mounting a turntable on said guide rail so as to be movable on said guide rail;

mounting a discharging nozzle moving apparatus on said turntable, said discharging nozzle moving apparatus having a rotating cover arm which can insert a discharging nozzle into a narrow space between said core shroud and an upper core grid plate;

positioning said discharging nozzle at a position at which compressive remaining stress is added to a surface of said core shroud in a radial direction and an axial direction of said core shroud by said discharging nozzle moving apparatus; and discharging water to add compressive remaining stress to a surface of said core shroud from said discharging nozzle.

* * * * *